2,960,450
ORGANO MANGANESE COMPOUNDS

Albert P. Giraitis, Tillmon H. Pearson, and Richard C. Pinkerton, Baton Rouge, La., assignors to Ethyl Corporation, New York, N.Y., a corporation of Delaware No Drawing. Filed Oct. 16, 1959, Ser. No. 846,793

8 Claims. (Cl. 204—59)

This invention relates to a process for the manufacture of organo manganese compounds and more particularly to an improved process for the manufacture of cyclopentadienyl manganese compounds. This application is a continuation-in-part of our co-pending application Serial No. 704,272, filed December 23, 1957.

Cyclopentadienyl manganese compounds have recently been discovered. The bis(cyclopentadienyl)manganese compounds are ionic in nature and thus are usually referred to as manganese cyclopentadienides. These latter compounds are very useful as intermediates in the production of cyclopentadienyl manganese tricarbonyl compounds which are non-ionic and which appear to be the most effective antiknocks for internal combustion engines presently known. The manganese cyclopentadienides, in contrast to the alkali metal cyclopentadienides are claimed to have a sandwich structure similar to ferrocene, i.e. the cyclopentadienyl groups are each bonded to the metal atom through the 5-carbon atoms of each of the cyclopentadienyl rings. Yet, in contrast to the other transition metal compounds, as pointed out above, the compounds are ionic and thus resemble the sigma bond alkali or alkaline earth metal compounds.

Manganese cyclopentadienides can be prepared by reaction of manganous halides with alkali metal cyclopentadienides, forming, in addition to the principal product, the corresponding alkali metal halide as a by-product. Thus, in manufacture, both valuable alkali metal and halogen are consumed in stoichiometric quantities. At the same time, these large quantities of inorganic salt seriously contaminate the reaction product and cause difficulty in the purification or recovery of the desired manganese cyclopentadienides. Accordingly, for subsequent reaction, such as carbonylation, it is usually necessary to use the manganese cyclopentadienide in its impure form containing the inorganic salt. In these subsequent reactions, one of the two cyclopentadienide radicals are displaced, e.g. by carbon monoxide, forming an organic polymer which, together with the inorganic salt, constitutes more than one-half of the resulting reaction product. This mixed impurity extremely complicates recovery of the desired product, i.e. cyclopentadienyl manganese tricarbonyl compounds. Any process for the preparation of manganese cyclopentadienides which results in the reduction or elimination of costly reactants or the elimination of by-products is obviously very desirable.

It is accordingly an object of this invention to provide an improved process for producing cyclopentadiene metal containing compounds. Another object is to provide an improved process for manufacture of manganese cyclopentadienides. Still another object is to provide a process whereby the manganese cyclopentadienide compounds can be formed directly from a cyclopentadiene hydrocarbon and manganese metal. Another object is to provide a process whereby cyclopentadienyl manganese tricarbonyl compounds can be produced without the concurrent formation of inorganic salts and with at least a minimum formation of undesired polymeric materials. Other objects and advantages of this invention will become more apparent from the following description and appended claims.

These and other objects of the invention are accomplished if the cyclopentadienyl manganese compounds are produced by passing an electric current through a manganese anode and an electrolyte containing a cyclopentadienide compound of a metal selected from groups I, II, III–A, IV–A and VIII of the periodic table, whereby the cyclopentadienyl radicals are transferred from the cyclopentadienide compound of the electrolyte to the manganese metal to form the desired manganese cyclopentadienide compound. The group I, II, III–A, IV–A and VIII metals are in accordance with the periodic table given in the Handbook of Chemistry and Physics, 36th edition, pages 392–393, Chemical Rubber Publishing Company. Thus, these compounds include sodium cyclopentadienide, sodium methylcyclopentadienide, sodium ethylcyclopentadienide, sodium hexylcyclopentadienide, sodium n-decylcyclopentadienide, sodium 1,2-methylethylcyclopentadienide, phenylcyclopentadienyl sodium, indenyl sodium, fluorenyl sodium and the corresponding compounds of lithium, potassium, rubidium, cesium, beryllium, magnesium, calcium, iron, cobalt, nickel, copper, zinc, cadmium, mercury and the like. The most preferred compounds are those containing cyclopentadienyl radicals having from 5 to 12 carbon atoms.

More particularly, the process of this invention comprises electrolyzing a metal cyclopentadienide compound, preferably in the presence of a solvent and/or a complexing agent, under conditions wherein the current density is from about 0.001 to about 1.0 amperes/sq. centimeter. In most cases, an optimum voltage across the cell is from 0.5 to 50 volts. Also, it is frequently desirable to periodically reverse the current (using two manganese electrodes) to minimize or eliminate electrode contamination, or superimpose on a direct current a source of alternating current, e.g. 60 cycles/minute.

The present process is also especially effective for the direct manufacture of cyclopentadienyl manganese tricarbonyl compounds, in which variation carbon monoxide (either as a gas or in the form of a carbonyl) is maintained in the electrolyte for immediate reaction with the manganese cyclopentadienide compound formed at the anode.

Up to the present time, the production of manganese cyclopentadienide from metallic manganese has not been successful, even using extremely active forms of manganese. However, it is now found that when an electrolyte containing sodium cyclopentadienide or other metal cyclopentadienide, as defined above, is subjected to an electric current, the cyclopentadienide radical is readily transferred to the manganese metal of the anode. This is particularly significant since the electrolyte can be conveniently regenerated in the cell with fresh cyclopentadiene hydrocarbon. Thus, in reality, this is the first time that manganese cyclopentadienides have been formed from a hydrocarbon and manganese metal, avoiding completely the cost and inconvenience resulting from the co-formation of inorganic salts.

It is recognized that non-ionic organo metallic compounds have been previously made by an electrolysis technique. For example, tetraethyllead has been made using a lead anode and an organo metallic electrolyte, such as triethyl aluminum. However, based upon this knowledge, it is entirely unexpected that the ionic manganese cyclopentadienides could be produced by electrolysis since, in contrast to tetraethyllead, the ionic manganese cyclopentadienides would themselves be expected to form an electrolyte and to be decomposed. For some unexplainable reason, this does not appear to take place. Also, the transformation through electrolysis of the cyclopentadienide radical from a sigma bond, e.g. as in sodium cyclopentadienides, to a "sandwich" bond, as in manganese cyclopentadienides, in which five carbon atoms are bonded to the manganese atom, is entirely without precedence and is clearly unexpected and unpredictable.

The process of this invention is applicable to the manufacture of a wide variety of manganese cyclopentadienide compounds as well as to the formation of the tricarbonyl derivatives thereof. The process is particularly desirable for the manufacture of compounds having cyclopentadienyl radicals containing from five to thirteen carbon atoms. Typical examples of manganese cyclopentadienide compounds which can be produced in accordance with this invention are manganese cyclopentadienide, manganese methylcyclopentadienide, manganese ethylcyclopentadienide, manganese n-octylcyclopentadienide, phenylcyclopentadienide, manganese 1,3-methylphenyl cyclopentadienide, manganese indenyl, manganese fluorenyl, as well as substituted indenyl and fluorenyl compounds.

The cyclopentadienyl manganese tricarbonyl compounds which can be produced in accordance with this invention correspond to the manganese compounds discussed above. These include, for example, cyclopentadienyl manganese tricarbonyl, methylcyclopentadienyl manganese tricarbonyl, indenyl manganese tricarbonyl and fluorenyl manganese tricarbonyl.

The following examples illustrate the novel features of the process of this invention. All parts are by weight, unless otherwise noted.

EXAMPLE I

Sodium methylcyclopentadienide was dissolved in tetrahydrofuran and diethylene glycol dimethyl ether solvent (0.8 moles of the sodium methylcyclopentadienide per liter of solution, the diethylene glycol dimethyl ether-tetrahydrofuran volume ratio was 1:4). This solution was then electrolyzed at room temperature using a pure manganese anode and a copper cathode. The electrolyte initially contained dissolved methylcyclopentadiene hydrocarbon so as to continually regenerate the electrolyte during electrolysis. An atmosphere of nitrogen was maintained in the electrolytic cell at a pressure of 1 to 2 millimeters above atmospheric pressure. The voltage was maintained throughout the electrolysis between 20 to 30 volts. The current density at this voltage ranged from 0.005 to 0.05. Immediately after the current was applied across the electrodes, the electrolyte around the anode turned a dark reddish-brown color and diffused throughout the electrolyte. Later, the electrolyte changed to a dark purple. After completing the electrolysis, the reaction product (electrolyte) was filtered and the manganese bis(methylcyclopentadienide) recovered. A sample of the reaction product was treated with dilute hydrochloric acid to convert the manganese bis(cyclopentadienide) to manganous chloride and the aqueous phase was then analyzed for soluble manganese. The current efficiency for the electrolysis was 25 percent.

EXAMPLE II

The electrolysis procedure of Example I was repeated except that pure diethylene glycol dimethyl ether solvent was employed (without the tetrahydrofuran). Also, manganese electrodes were used for both the anode and cathode. After initiation of the electrolysis, the solution immediately turned a dark reddish-brown color around the anode. The manganese methylcyclopentadienide is recovered in good yield. The solution was analyzed as in Example I and showed a current efficiency of 3 percent.

EXAMPLE III

Example I was repeated except that a complex electrolyte was employed containing as solvent diethylene glycol dimethyl ether and triethyl boron (10 percent by volume of triethyl boron, based upon the triethyl boron diethylene glycol dimethyl ether mixture). This mixture has appreciably greater conductivity than electrolytes with the triethyl boron or other complexing agents. As in Example II, both electrodes were manganese. The voltage in this example ranged from 20 to 30 volts. Immediately following operation of the cell, the solution became a dark reddish-brown. The manganese bis(methylcyclopentadienide) is recovered in good yield. Prior to recovery, triethylamine was added to the electrolyte to complex the triethyl boron.

EXAMPLE IV

Example I was repeated except that the solvent employed contained 10 volume percent of diethylene glycol dimethyl ether and 90 volume percent pyridene. Again both electrodes were manganese and the molarity of the electrolyte was 0.8. In this example, the current was alternated every 30 seconds and essentially no polymer was disposed on the electrodes. A good yield of manganese bis(methylcyclopentadienide) is obtained. When the above electrolysis was repeated and the current was alternated in separate tests after periods of three seconds; five seconds; and one minute, similar results were obtained.

EXAMPLE V

Example II was repeated except that the current was alternated in 3-second periods and a carbon monoxide atmosphere (atmospheric pressure) was maintained in the cell in order to convert the manganese bis(methylcyclopentadienide) formed in the electrolysis to methylcyclopentadienyl manganese tricarbonyl. A good yield of methylcyclopentadienyl manganese tricarbonyl is obtained.

EXAMPLE VI

An electrolyte was prepared by reacting 3.36 parts of sodium metal with 14.26 parts of methylcyclopentadiene in 9.5 parts of diethylene glycol dimethyl ether at a temperature of 110° C. This electrolyte is then saturated with methylcyclopentadiene and placed in the electrolysis cell having manganese electrodes. The temperature of the electrolysis is maintained at 170° C. and 200 p.s.i. of carbon monoxide pressure is maintained on the cell. The nitrogen atmosphere of Example I is not used. Good yields of methylcyclopentadienyl manganese tricarbonyl are obtained. The higher temperature materially increases the conductivity of the electrolyte. Also, the carbonylation reaction is increased under these conditions.

When the above example is repeated using both direct current and superimposed 60 cycle alternating current (30 volts), very excellent results are obtained and the tendency to form a polymer at the anode is minimized.

The methylcyclopentadienyl manganese tricarbonyl compound prepared above when mixed with gasoline increases appreciably the octane rating of the gasoline. The following table illustrates the effectiveness of methylcyclopentadienyl manganese tricarbonyl, using a commercial gasoline having an initial boiling point of 94° F. and a final boiling point of 390° F. The antiknock value of the fuel determined by the ratings are given in octane numbers for figures below 100 and in Army-Navy performance numbers for values above 100. The method of determining performance numbers is explained in the booklet, "Aviation Fuels and Their Effect Upon Engine Performances," NAVAER-06-5-501, USAF T.O. No. 06-5-54, published in 1951.

*Table I*

COMMERCIAL GASOLINE HAVING AN IBP OF 94° F. AND AN FBP OF 390° F.

| $C_6H_7Mn(CO)_3$, g. metal/gal. | Octane Rating |
|---|---|
| 0 | 83.1 |
| 1.0 | 92.7 |
| 2.0 | 95.8 |
| 3.0 | 98.0 |
| 5.0 | 102.0 |

EXAMPLE VII

Lithium cyclopentadienide is used as the electrolyte in the technique of Example I. The lithium cyclopentadienide is prepared by reacting cyclopentadiene with lithium metal in diethylene glycol diethyl ether. The electroyltic cell has manganese anodes and platinum cathodes. The electrolysis is conducted at 180° C. and is pressurized with carbon monoxide at 500 p.s.i. Good yields of cyclopentadienyl manganese tricarbonyl are produced.

EXAMPLE VIII

Ethylcyclopentadienyl manganese tricarbonyl is prepared by the electrolysis of potassium ethylcyclopentadienide using a manganese electrode and graphite cathode. In this example, tetrahydrofuran is employed as the solvent and the temperature is maintained at 100° C. and a carbon monoxide pressure of 1000 p.s.i. is empolyed. An excellent yield of ethylcyclopentadienyl manganese tricarbonyl is obtained.

EXAMPLE IX

Manganese n-decylcyclopentadienide is prepared by the electrolysis of a mixed electrolyte containing 50 percent by weight n-decylcyclopentadienyl sodium and 50 percent by weight n-decylcyclopentadienyl potassium. Diethylene glycol dibutyl ether is employed as the solvent (0.1 molar). The temperature of the electrolysis is maintained at 200° C. The voltage, current density and other conditions were similar to Example I. The electrolyte agitated throughout the electrolysis.

EXAMPLE X

Bis(indenyl) manganese is prepared by electrolyzing bis(indenyl) magnesium in a saturated solution of dimethyl ether containing indene. The electrolysis is conducted at 200° C. A good yield of bis(indenyl) manganese is obtained. Other conditions are the same as Example II.

EXAMPLE XI

Bis(fluorenyl) manganese is prepared using a manganese anode and an aluminum cathode by the electrolysis of trisfluorenyl aluminum in a saturated solution of diethyl ether solvent. The electrolysis is conducted at reflux temperature. A good yield of bis(fluorenyl) manganese is obtained.

The trisfluorenyl aluminum is prepared by reacting bis(fluorenyl) mercury with aluminum metal (activated with dilute hydrochloric acid) at a temperature of 100° C., using diethylene glycol diethyl ether as the solvent.

EXAMPLE XII

An electrolyte consisting of a saturated solution of copper (phenylcyclopentadienide) in benzene containing, as complexing agent, 10 percent by volume based on the solvent of aluminum triethyl, is electrolyzed at 70° C., using manganese electrodes. The voltage ranged from 20 to 25. The solvent also contains a saturating quantity of iron pentacarbonyl which reacts with the manganese (phenylcyclopentadienide) to form phenylcyclopentadienyl manganese tricarbonyl. The current density of the electrolysis is maintained between 0.001 and 0.03. The phenylcyclopentadienyl manganese tricarbonyl is obtained in good yield.

EXAMPLE XIII

Bis(1,2-diethylcyclopentadienyl) thallium is electrolyzed at 60° C. in a saturated solution in n-butyrolactone, in the presence of a saturating quantity of nickel carbonyl. The anode employed is manganese and a platinum cathode is used. The 1,2-diethylcyclopentadienyl manganese tricarbonyl is obtained in good yield.

Similar results are obtained in making 1,3-methylphenylcyclopentadienyl manganese tricarbonyl, using cyclohexylamine as the solvent and manganese pentacarbonyl as the carbon monoxide source.

EXAMPLE XIV

Bis(butyl) cyclopentadienyl iron is electrolyzed in a saturated solution of dimethyl formamide using ferromanganese electrodes. The system is pressurized with 500 p.s.i. of carbon monoxide pressure. The electrolysis is conducted at a temperature of 165° C., using a 15 to 20 volt potential. A good yield of butylcyclopentadienyl manganese tricarbonyl is obtained.

In addition to or instead of the solvents and complexing agents discussed above, inorganic salts can be employed along with the metal cyclopentadienides to increase conductivity of the electrolyte. For example, a complex mixture of sodium cyclopentadienide and sodium chloride or fluoride can be employed, with or without a solvent. In general, the concentration of salt can range from about 10 to 80 percent by weight based on the weight of the metal cyclopentadienide. In some cases, it is even desirable to carbonylate a salt-cyclopentadienide manganese mixture, i.e. manganous halide-manganese cyclopentadienide mixture. A particularly suitable mixture is in essentially equal molecular proportions, i.e. a complex manganese cyclopentadienide halide, such as manganese methylcyclopentadienide chloride. The following is a typical example of such a carbonylation.

EXAMPLE XV

Manganese methylcyclopentadienide is formed as by electrolysis in accordance with the procedure of Example I. This product (1 mole) is then mixed with equal molecular quantities of manganous chloride, dissolved in 0.8 mole of diethylene glycol dimethyl ether. This electrolyte is then electrolyzed in a cell at 170° C., using a manganese anode and cathode, having a saturating atmosphere of both methylcyclopentadiene and carbon monoxide. The methylcyclopentadienyl manganese tricarbonyl is produced in good yield. Good results are also obtained in the carbonylation reaction if the manganese cyclopentadienide is made by known chemical means, e.g. reaction of manganous chloride with sodium methylcyclopentadienyl.

The temperature of the electrolysis, as illustrated in the above examples, can be conducted generally from about −50° to 250° C. With liquid ammonia, for example, the lower temperatures are preferred but when solvents having higher boiling points are employed, it is usually desired to carry out the electrolysis at temperatures near the boiling point of the solvent. Thus, with most solvents, the preferred temperature is between 20° C. and 200° C.

Any of a wide variety of solvents can be employed in the process of this invention. In general, the solvents are inert to both the reactants and the products. However, solvents which form a complex with the cyclopentadienyl metal compound are very desirable since complexing usually improves conductivity of the electrolyte. The most preferred solvents are ethers, acetals, amines, hydrocarbons, and other liquid media which under conditions of the process aid in the conductivity of the electrolyte. Typical examples of suitable solvents are ethers such as the aliphatic ethers containing 2 to 10 carbon atoms, e.g. dimethyl ether, diethyl ether, dibutyl ether, polyethers such as ethylene glycol diethyl ether, ethylene glycol dibutyl ether, diethylene glycol dimethyl ether, diethylene glycol methylethyl ether, diethylene glycol diethyl ether, diethylene glycol dibutyl ether, triethylene glycol dimethyl ether and other polyethylene glycol ethers having alkyl groups of from 1 to 6 carbon atoms. Other suitable ethers are tetrahydrofuran and dioxane. Suitable acetals are methylal, 1,1-dimethoxy ethane, 1,1-dimethoxy propane, 1,1-dimethoxy butane, glycol formal, methyl glycerol formal and the like. Hydrocarbons are also useful as solvents including benzene, toluene, xylene, ethyl benzene and the like. Other suitable solvents are the lactones such as n-butyrolactone, propylene carbonate, dialkyl sulfoxides such as dimethyl sulfoxide and the like.

The quantity of solvent can vary over wide ranges. For conductivity reasons, highly concentrated solutions are preferred. Thus with most solvents a saturated solution of the cyclopentadienyl metal compound in the solvent is preferred. In general, the molarity of the electrolyte will range from about 0.1 to about 5.

In some cases, it is desirable to use a manganese cathode as well as anode and alternate the current in order to prevent an undue build-up of polymer on the electrodes. When alternation is employed, the rate of alternation should be sufficiently slow to prevent undue decomposition of the manganese cyclopentadienide product. This technique is particularly useful when the manganese cyclopentadienide compound formed in the electrolysis is further reacted, such as with carbon monoxide, to form a more stable manganese product. In many cases, it is desirable to employ a direct current superimposed with an alternating current of any desired frequency but preferably having the usual frequencies provided commercially. Thus, 60 cycle A.C. current is frequently desired.

The current density depends on the physical nature of the cell, on the particular electrolyte employed and on the voltage impressed across the cell. In general, the current density is from 0.001 to 1 ampere per square centimeter and preferably from 0.01 to 0.1 ampere per square centimeter.

The voltage useful in the process of this invention can range generally from about 0.5 to about 50 volts and preferably is from about 5 to 25 volts. Lower voltages can be used, although the production rate is somewhat lower than desired commercially. Higher voltages can also be used, although the current efficiency of the cell generally falls off at the more elevated voltages.

Diaphragms can be used in the process of this invention in order to prevent migration of ions within the cell itself. Any of the known diaphragms can be used, particularly porous ceramics such as clays, alumina and in some cases porous Teflon or other plastic materials. A glass frit is sometimes useful.

The electrolysis process can be conducted with or without agitation. In some instances, the conductivity of the electrolyte is reduced with agitation. However, in systems wherein the electrodes tend to be contaminated with by-products such as polymer, agitation is frequently beneficial.

The anode can be formed of pure manganese or can be alloys of manganese with other metals. Particularly suitable anodes are ferromanganese in which the iron content can range from about 5 to 60 percent. Other alloys are amalgams, nickel, copper, zinc or alloys with other metals. Moreover, it is frequently desired to use a porous anode, e.g. pressed from powdered manganese with or without a suitable binder. Such anodes are particularly useful when reacting the manganese cyclopentadienide compound with carbon monoxide since the gaseous carbon monoxide can be continuously bled into the cell through the porous anode.

The cathode can be constructed of manganese or other suitable conductors. Typical examples of satisfactory cathodes are graphite, copper aluminum, platinum, palladium, silver, iron and the like.

In addition to the solvents noted above, conducting salts are frequently desirable which improve the conductivity of the electrolyte. Typical examples of conducting salts are the groups I-A, II-A and III-A halides such as sodium chloride, potassium bromide, potassium fluoride, lithium bromide, lithium fluoride, magnesium chloride, magnesium bromide, calcium bromide, calcium chloride and aluminum bromide. Also the complex hydrides or organo compounds are very effective in increasing the conductivity of the electrolytes of this invention, the organo compounds being preferred. Typical examples of hydrides are the sodium borohydride, lithium aluminum hydride, sodium aluminum triethyl hydride, lithium aluminum triethyl hydride, potassium aluminum hydride, potassium aluminum triethyl hydride, sodium aluminum triisobutyl hydride, and the like. The preferred solvents are alkali metal complexes with organometallic compounds of aluminum and boron complexes, such as triethyl aluminum-sodium fluoride, e.g. $AlEt_3 2NaF$, and especially alkali metal aluminum or boron tetraalkyls wherein the alkyl group contains from about 2 to 15 carbon atoms. Examples of these are sodium aluminum tetraethyl, potassium aluminum tetraethyl, lithium aluminum tetraphenyl, lithium aluminum tetraethyl, sodium aluminum tetraisobutyl, sodium aluminum triisobutyl ethyl, sodium aluminum tetraoctyl, potassium aluminum tetradodecyl and the like. The alkali metal is preferably lithium, sodium, potassium and mixtures thereof, but can also be rubidium, cesium or francium. Best results are obtained with mixed metal compounds, i.e. sodium and potassium aluminum tetraethyl.

These complexes can be employed in electrolytes having a molarity ranging from about 0.01 to about 5. Electrolytes containing relatively large quantities of the complex solvents are preferred due to the very high conductivity of these metal complexes. However, these complexes are very good solvents for the alkali metal cyclopentadienyl compounds and thus can contain high concentrations while maintaining their good conductance properties.

The following electrolytes are employed using the apparatus and conditions of Example I, giving high yields of the desired manganese bis(methylcyclopentadienide).

Table II

| Ex. No. | Electrolysis Temp., °C. | Solvent | Moles Solvents/Mole NaMCp[1] |
| --- | --- | --- | --- |
| XVI | 150 | $NaAl(C_2H_5)_4$ | 2 |
| XVII | 90 | $\begin{cases} NaAl(C_2H_5)_4 \\ KAl(C_2H_5)_4 \end{cases}$ | 10 |
| XVIII | 100 | $Al(C_2H_5)_3$—2NaF | 100 |
| XIX | 100 | $NaAl(C_{10}H_{21})_4$ | 0.5 |

[1] NaMCp = sodium methylcyclopentadienide.

We claim:

1. The process of producing a manganese cyclopentadienide comprising passing an electrolyzing current from an anode containing metallic manganese to a cathode through an electrolyte comprising a solution of a metal cyclopentadienide of a metal other than manganese in an organic solvent.

2. The process of claim 1 wherein the electrolyte also contains unreacted cyclopentadiene hydrocarbon to regenerate the electrolyte.

3. The process of claim 1 wherein the electrolysis is conducted in the presence of carbon monoxide.

4. The process of claim 1 wherein the metal of the metal cyclopentadienide is a metal selected from the group consisting of lithium, sodium, potassium, rubidium and cesium.

5. The process of claim 1 wherein the metal cyclopentadienide is a sodium cyclopentadienide.

6. The process of claim 1 wherein the metal cyclopentadienide is dissolved in an ether solvent.

7. The process of claim 1 wherein the metal cyclopentadienide is sodium methylcyclopentadienide and the product is manganese bis(methylcyclopentadienide).

8. The process of claim 1 wherein the solvent is an alkali metal tetraalkyl complex of an element selected from the group consisting of boron and aluminum, wherein each organo group contains not more than 15 carbon atoms.

References Cited in the file of this patent

Jones et al.: Chemical Reviews, vol. 54 (October 1954), pp. 844 and 845.